us011481082B2

(12) United States Patent
Galarneau et al.

(10) Patent No.: US 11,481,082 B2
(45) Date of Patent: *Oct. 25, 2022

(54) SYSTEM AND METHOD FOR OPTIMIZING THE VIEWABILITY OF WEBSITE CONTENT

(71) Applicant: OpenX Technologies, Inc., Pasadena, CA (US)

(72) Inventors: Joseph Galarneau, New York, NY (US); Ihab Rimawi, New York, NY (US); Joseph Titlebaum, Bethesda, MD (US); Kyrylo Myrnenko, Cracow (PL); Cezar Pokorski, Cracow (PL)

(73) Assignee: OpenX Technologies, Inc., Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/170,421

(22) Filed: Feb. 8, 2021

(65) Prior Publication Data
US 2021/0200388 A1 Jul. 1, 2021

Related U.S. Application Data

(63) Continuation of application No. 14/986,540, filed on Dec. 31, 2015, now Pat. No. 10,915,215.

(60) Provisional application No. 62/098,797, filed on Dec. 31, 2014.

(51) Int. Cl.
G06F 3/0481 (2022.01)
H04L 67/02 (2022.01)
G06Q 30/02 (2012.01)
H04L 67/561 (2022.01)

(52) U.S. Cl.
CPC ............ *G06F 3/0481* (2013.01); *H04L 67/02* (2013.01); *G06Q 30/0277* (2013.01); *H04L 67/561* (2022.05)

(58) Field of Classification Search
CPC .................................................... G06F 3/0481
See application file for complete search history.

(56) References Cited

U.S. PATENT DOCUMENTS

| 8,935,620 | B1* | 1/2015 | Cox | G06F 3/0483 715/760 |
| 2011/0251902 | A1* | 10/2011 | Nagarajayya | G06Q 30/0275 705/14.71 |
| 2014/0281902 | A1* | 9/2014 | Feuerlein | G06F 16/958 715/234 |

* cited by examiner

*Primary Examiner* — Roland J Casillas
(74) *Attorney, Agent, or Firm* — Patent Law Works LLP

(57) ABSTRACT

In a computing device executing a master tag embedded in a webpage, identifying a first subsequent tag in the webpage; identifying a second subsequent tag called by the first subsequent tag; identifying information collected by one or more of the first and second subsequent tag; identifying the location of the tag(s) embedded on the webpage in relation to the portion of the webpage currently in view by the party interacting with the webpage; controlling the order of the firing of tags in accordance with rules determined by the user for purposes of increasing the viewability of advertising and other related content; and automatic modification of the order of the firing of tags based on actions taken by the visitor to the webpage.

20 Claims, 8 Drawing Sheets

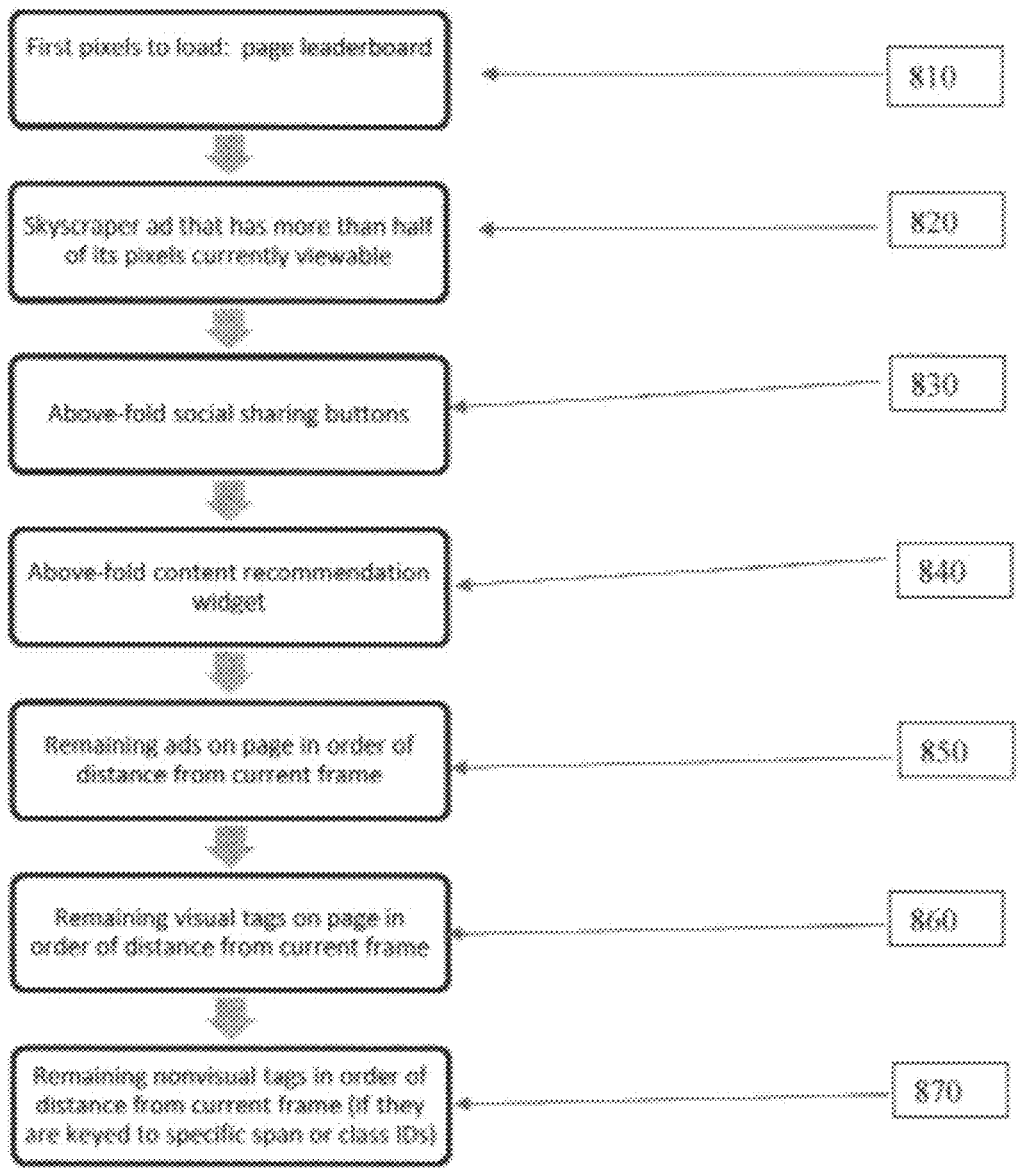

SYSTEM AND METHOD FOR OPTIMIZING THE VIEWABILITY OF WEBSITE CONTENT

This application is a continuation of U.S. patent application Ser. No. 14/986,540, filed Dec. 31, 2015, which claims priority to U.S. Provisional Application. No. 62/098,797, filed Dec. 31, 2014, both of which are incorporated herein in their entireties.

TECHNICAL FIELD

The present disclosure relates to the timely presenting of content and information in web browsers.

BACKGROUND

As the Internet and Internet commerce have expanded, various website owners have sought to monetize visitors to their websites by the presentation of paid content, like advertisements.

Advertisements come in various forms, including banner advertisements at the top or the bottom of the page, "skyscraper" advertisements along the side of a page, video advertisements which appear at the beginning or end of video content, and various other sorts of paid content.

Historically, website owners were compensated when a visitor "clicked on" or otherwise responded to or interacted with the advertisement placed on the website. This is analogous to the business model of "direct response" advertising on television.

This has been supplemented by the payment for ads on an "impression" basis, where the advertiser pays for the opportunity to present an ad to the website audience. This sort of advertising is similar in concept to most television and print advertising.

In recent years, advertisers have become concerned that advertisements may not actually be viewed by the visitors to websites, as some web pages require scrolling for the visitor to view all of the content or network latency delays ads from rendering until after the visitor has left the page. Accordingly, the online advertising industry has developed standards for when an advertisement is considered viewable, and advertisers have sought to pay only for those advertisements that meet the applicable "viewability" standards.

Websites manage the loading of the different portions of the site in different ways, with some portions loading synchronously and others asynchronously.

Many website owners have built their sites without regard to considering whether certain portions of the site take longer to load than others, and whether the website visitor's internet browser gives priority to certain content over other content.

With the emergence of "viewability" standards, it has become important for website owners to prioritize the loading of certain advertisements, to maximize the likelihood that these ads will be considered viewable.

The content of advertisements is often loaded from third-party sources like ad networks and others. One conventional method for accessing third-party advertising and other content is through the use of tags.

In at least one conventional form, a tag is a hidden element within a webpage that causes some action to occur on a webpage when it is "fired." In particular, in at least one implementation, a tag is a piece of code, e.g., JavaScript, that is placed within a webpage and allows a webpage owner to track information about the visitors who download and execute the particular piece of code.

For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor. Tags can be provided by first parties (i.e., the operator of the website), but often are provided to the first party by third parties that offer digital services, such as ad trafficking, social networks, or analytic s. The data that is transmitted to these third parties is often used in the provision of services back to the first party or is monetized directly, as in the case of data brokers.

Once executed, a tag can gather information such as where the visitor came from (e.g., what webpage or search engine), what keywords were used to find the webpage, whether a particular advertisement directed a visitor to the page, and other related data. A tag may, for example, perform operations such as:

Examine local browser data pertaining to the specific webpage user (i.e., the party interacting with the webpage), as permitted by browser configuration. Examples include content on the page, local machine OS, referring page, or clickstream data.

Examine cookies contained on the local machine, as well as setting new cookies.

Transmit data to external servers.

Modify the presentation of the current webpage or performing other webpage user interface actions, such as displaying pop-ups or pop-unders.

The execution of a tag can enable the operation of an advertising server and determine the sort of ad to be placed on the page, for example advertisements of potential relevance or "targeted" to the reader of the page.

In many situations, a webpage can comprise multiple tags from a variety of different parties. For example, a particular webpage may contain a Google Analytics tag, a Facebook tag, a page-counter tag, a weather tag, advertising network tags and other common tags. The average website contains about 20 tags, and some sites may have more than 100.

One development to help with issues relating to the control of tags within websites has been the implementation of tag management systems. Conventional tag management systems function by replacing the plurality of individual tags on a webpage with a single master tag (in some implementations, referred to as a "container tag"). When the master tag is loaded, the tag management system identifies, using a set of rules, which of the plurality of individual tags should be allowed to run on the webpage. The tag management system can then inject the identified tags into the webpage through the master tag.

A properly implemented tag management system can provide the benefits of, among other things, only requiring a single tag to be implemented on each page of a website and providing a single interface through which all of the tags can be controlled. In practice, however, it can be difficult to implement a tag management system within a website that has previously placed tags within its pages. In particular, it can be difficult to determine what rules should be applied to each individual page within a website in order to ensure that a tag management system associates the correct tags with each individual page.

In addition the tag management system can be used to create a logical order to the firing of tags and the rendering of content on the web page. In instances where these tags are associated with advertisements, changing the order of tag firing can improve ad viewability by accelerating the rendering of ads that appear in the portion of the page that the visitor's browser is rendering.

Many web pages have content that falls outside the window of web browsers. In these instances, visitors who wish to view this content are forced to scroll their browsers to view this content. In some instances, this content includes advertisements.

A tag management system may also change the logical order of firing of tags and rendering of content on the web page based on actions of the visitor after the page is loaded. This may have the effect of improving ad viewability by deprioritizing rendering of ads that now fall outside the visitor's web browser screen and increasing the priority of rendering of ads that now fall within the browser's active screen.

BRIEF DESCRIPTION OF THE DRAWINGS

FIG. 8 is a flowchart illustrating the process of identifying the most desirable order of allowing tags to fire and rendering advertisements on a web page, according to an embodiment.

DESCRIPTION OF EXAMPLE EMBODIMENTS

Overview

In a computing device executing a master tag embedded in a webpage, a first subsequent tag in the webpage is identified. A second subsequent tag called by the first subsequent tag is also identified. Information collected by one or more of the first and second subsequent tags is identified. A location is identified, to which the collected information is sent. An indication is provided to a user of the system described herein, indicating the information collected and the location to which the collected information is sent. In addition, the master tag may determine a number of cookies dropped by the first subsequent tag; determine one or more characteristics of each cookie dropped by the first subsequent tag; and indicate the number of cookies dropped and the one or more characteristics of each cookie dropped. This processing allows for the controlling and tracking of data related to the set of parties interacting with a webpage, i.e., the audience for the webpage.

Note that the term "user" as used from this point forward refers to a user of the system described herein, e.g., the owner, manager, or administrator of a website in which embedded tags are discovered and/or analyzed.

EXAMPLE EMBODIMENTS

Implementations of the present invention overcome one or more problems in the art with systems, methods and apparatus configured to use a tag management system. The tag management system incorporates a master tag into a webpage to identify other tags that are embedded within a webpage. The master tag can monitor, and in some cases control, the execution of those tags. In particular, a master tag can communicate with a server that aids in analysis of other tags within the webpage. Additionally, a master tag can aid in the preparation of data that outlines the various tags that are located within a webpage and provides characteristics about at least some of the tags.

Stated alternatively, the systems and processes described herein allow webpage owners and managers to gain both visibility into tag related transactions and control over them. The tag management system is configured to bootstrap over all other tags on the page. This gives the system described herein a measure of dominion over the operation of the embedded tags, including determining the order certain tags fire and the priority of the loading of content on the page.

Figure 1:
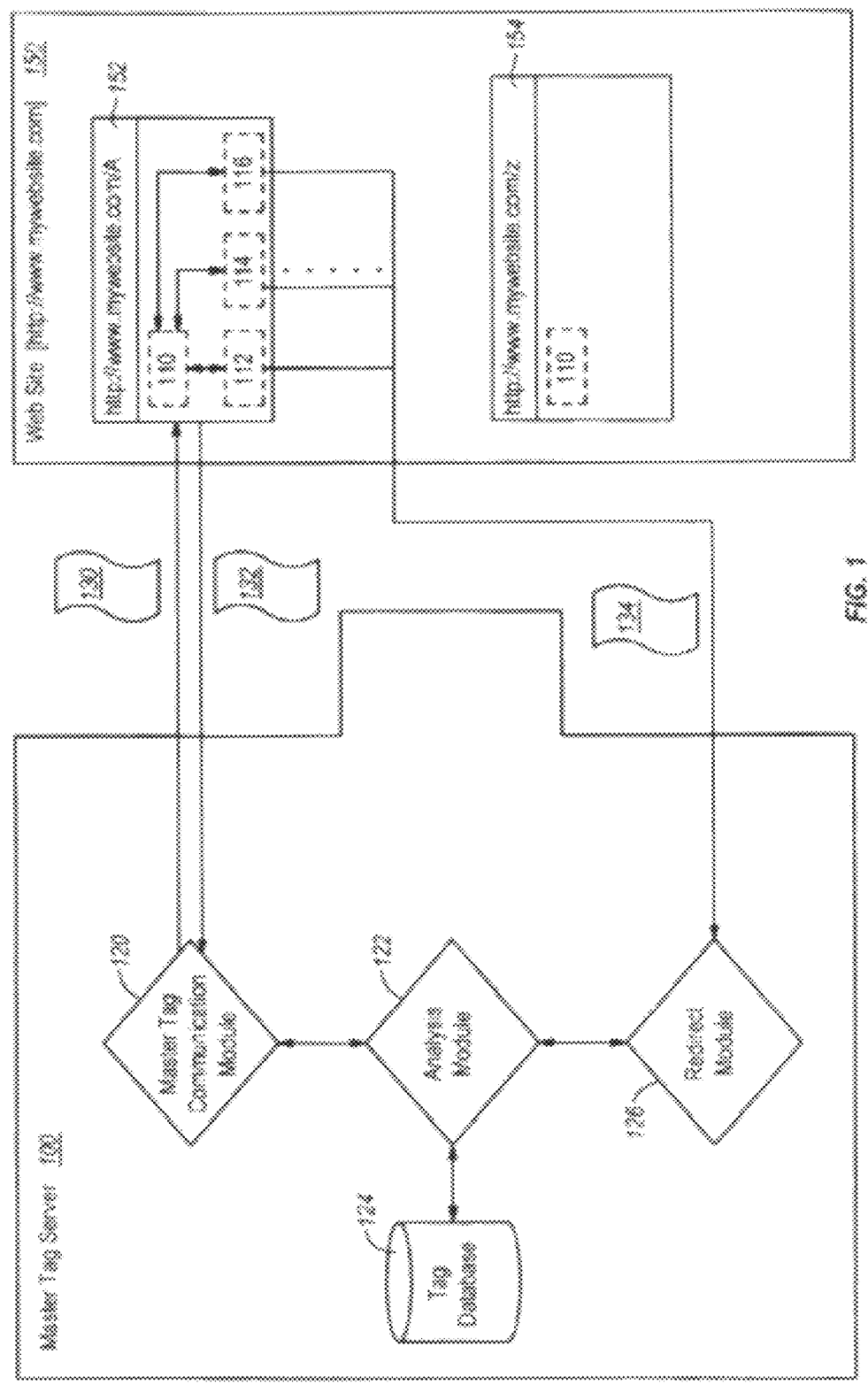
FIG. 1 is illustrates an architectural schematic diagram of a system for using a master tag to monitor and control other tags on a website, according to an embodiment.

FIG. 1 illustrates an architectural schematic diagram of a system for using a master tag to monitor and control other tags on a website. For example, FIG. 1 shows a master tag server 100 that is in communication with a website 150. In particular, the master tag server 100 can be in communication with a master tag 110 that is embedded within webpages 152 and 154 of the website 150. Additionally, in at least one implementation, the master tag server 100 can be part of a larger tag management system.

As depicted in FIG. 1, the master tag server 100 comprises a master tag communication module 120, an analysis module 122, and a tag database 124. Additionally, as depicted in FIG. 1, the website 150 comprises a plurality of webpages 152, 154. Further, at least a portion of the webpages include one or more tags 110, 112, 114, 116, of which tag 110 is a master tag 110. In at least one implementation, a master tag 110 can be embedded into one or more of the webpages 152, 154 within a website 150.

In at least one implementation, the master tag server 100 can send data 130 to and receive data 132 from each master tag 110 embedded within each respective webpage 152, 154. For example, the master tag server 100 and each respective master tag 110 can exchange data relating to analysis of the other tags 112, 114, 116 within each respective webpage 152, 154. Communications from the master tag 110 to the master tag server 100 can be used for purposes of capturing data reported by the master tag 110.

Additionally, in at least one implementation, the master tag 110 fires before any other tags 112, 114, 116. In particular, if the master tag 110 fires before the other tags 112, 114, 116 it can monitor the other tags before and while they execute.

A website's embedded tags (written in JavaScript, for example) may be analyzed by the master tag 110 and master tag server 100 as they reside and operate in the browser environment. The analysis can identify what elements in the browser environment are being examined by the tag as part of its programming, for example. The analysis may contain both the technical name of the browser data element, as well as provide a plain English description. For example, the technical element may be called XYZ, but the plain English description could be "Screen width."

In an embodiment, the processing described herein can monitor the interaction of a tag with a cookie. In particular, cookie dropping and cookie examination activities performed by any of the tags 112, 114, and 116 can be monitored by master tag 110. Master tag 110 may determine, for instance, the number of cookies dropped and the characteristics of each cookie, such as contents, expiration, size, and other characteristics of a cookie. In both instances, this information may be translated to plain English explanations for the benefit of a website owner or manager.

In an embodiment, the system described herein can also identify what interface actions a tag takes, such as displaying an ad or social widget, providing a news ticker, or playing a video, and the order in which this information is provided to the viewer of the page. The system can also determine what data is being transmitted, and to what parties. The system can also determine the location of the content relating to the data on the website page, whether that portion of the page is within the viewer's field of view, and/or its distance from the field of view. More generally, the operation of a tag may be controlled in an embodiment, so that a tag payload and/or its functionality may be blocked or altered, or the timing of the functionality may be accelerated or delayed. In an embodiment, machine learning or other methods may be used to analyze tag activity, to facilitate detecting, categorizing, and/or to order and prioritize the loading of content on a page.

In at least one implementation, the master tag 110 sends data 132 to a master tag communication module 120 within the master tag server 100. Specifically, the master tag 100 can send data relating to the presence of other potential tags 112, 114, 116 on the same webpage as the master tag 110. Upon receiving the data from the master tag 110, the master tag communication module 120 can communicate the data 130 to the analysis module 122.

The analysis module 122 can then analyze the received data. In at least one implementation, the analysis module 122 identifies the tags 112, 114, 116 that are associated with each webpage 152, 154 by referencing a tag database 124 or other functionally similar mechanism or data structure. In particular, the analysis module 122 can compare the data 132 received from a master tag 110 to all of the known tags within the tag database 124. For example, the master tag 110 may send to the master tag server 100 data relating to tag 112. The analysis module 122 can compare the received data 132 to known tags that are contained within the tag database 124. The tag database 124 may contain a signature of tag 112. Using the signature for tag 112 that is stored in the tag database 180, the analysis module 160 can identify that the particular webpage contains tag 112.

In an embodiment, the master tag 110 can also override functions of a tag that comes after the master tag. This may be accomplished by superseding the JavaScript or HTML commands in the downstream tag. This feature can be used to stop operation of a tag or redirect its output, for example and without limitation.

For example, in at least one implementation, the master tag 110 can manipulate the execution of the other tags 112, 114, 116 on the webpage 152. For example, the master tag 110 on webpage 152 can prevent tags 112, 114, and 116 from firing, or it can prioritize the order in which the tags fire.

Further, in at least one implementation, the master tag 110 can capture or redirect the communications of another tag 112, 114, 116. Tags 112, 114, 116 may operate by communicating with a server or other device or process that is external to the website 152. The external server can use these communications to gather information about individuals who visit a particular website 150. The master tag may identify and record the information that is being communicated by the tags 112, 114, 116 to their respective external servers. In at least one implementation, when the master tag 110 monitors the communications of another tag 112, 114, 116 it may also prevent the tag from communicating with the external server.

In addition to the above recited methods of data gathering and tag control, the master tag 110 can identify "n-party" tags in an embodiment. N-party tags are tags that are called into the page by tags directly managed by the master tag 110. An example would be a tag involved in real-time bidding advertising transactions. Also, many publisher-side third party tags are just bootstrap code for larger content delivery network (CDN)—stored tags. In some situations, there may be a tag that calls in another tag that calls in another tag and so on, for several iterations. The master tag 110 may be configured to identify each of these downstream tags, their relationship to the calling tags, and perform the actions described herein on these downstream tags, including controlling the timing of the firing of these downstream tags For example, the code contained in the webpage for some tags may include only limited functions that are oriented around loading other tags from remote servers. For instance, Tag A could just be a loader for Tags B . . . . F, which perform the actual functions (e.g., collect data, drop cookies, etc.). The CDN may be a commercially available service like Akamai™ or Amazon CloudFront™ where digital files can be distributed to data centers around the world to speed their delivery to the end user (by being geographically closer).

In the methods recited above, a master tag 110 enables a tag management system to efficiently monitor a website 150 without requiring that every tag 112, 114, 116 within the website 150 be removed. In at least one implementation, the master tag 110 is able to selectively control the tags 112, 114, and 116 that are present within each of the webpages 152, 154 of the website 150. Additionally, at least one implementation, the system provides continual monitoring of tags 112, 114, 116 of a website 150 after a tag management system has been implemented.

Additionally, in at least one implementation, the analysis module 122 in conjunction with the master tag 110 can provide a variety of information to a website owner or manager. Such information may be presented through a graphical interface.

Figure 2:
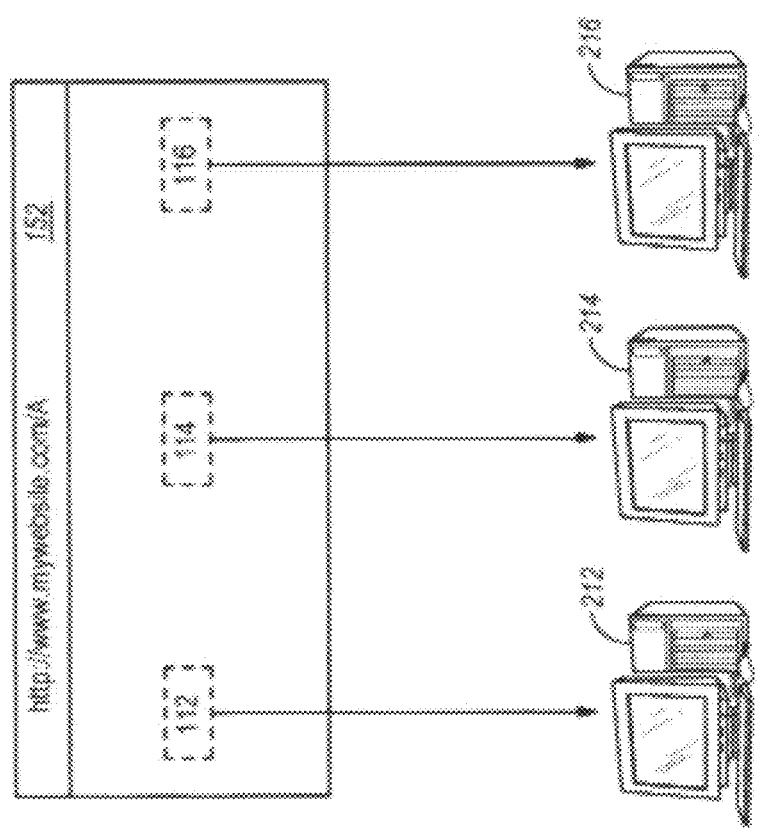
FIG. 2 is illustrates a depiction of a webpage in communication with a plurality of servers, according to an embodiment.

FIG. 2 depicts the webpage 150 of FIG. 1 in communication with a plurality of servers 212, 214, 216. In particular, tag 112 is in communication with external server 212, tag 114 in communication with external server 214, and tag 116 in communication with external server 216. As described above, each tag 112, 114, 116 on a webpage 150 may communicate with a respective external server 212, 214, 216. As the tags fire and communicate with the external servers 212, 214, 216, the external server can gather data about individuals who view a particular webpage 152.

In the implementation depicted by FIG. 2, a master tag 110 has not been embedded within the webpage 152. Additionally, a tag management system is not controlling the managing the tags 112, 114, 116. As depicted, the tags 112, 114, 116 fire when they are loaded. Additionally, the tags 112, 114, 116 communicate to their respective external servers 212, 214, 216 each time they fire.

Figure 3:
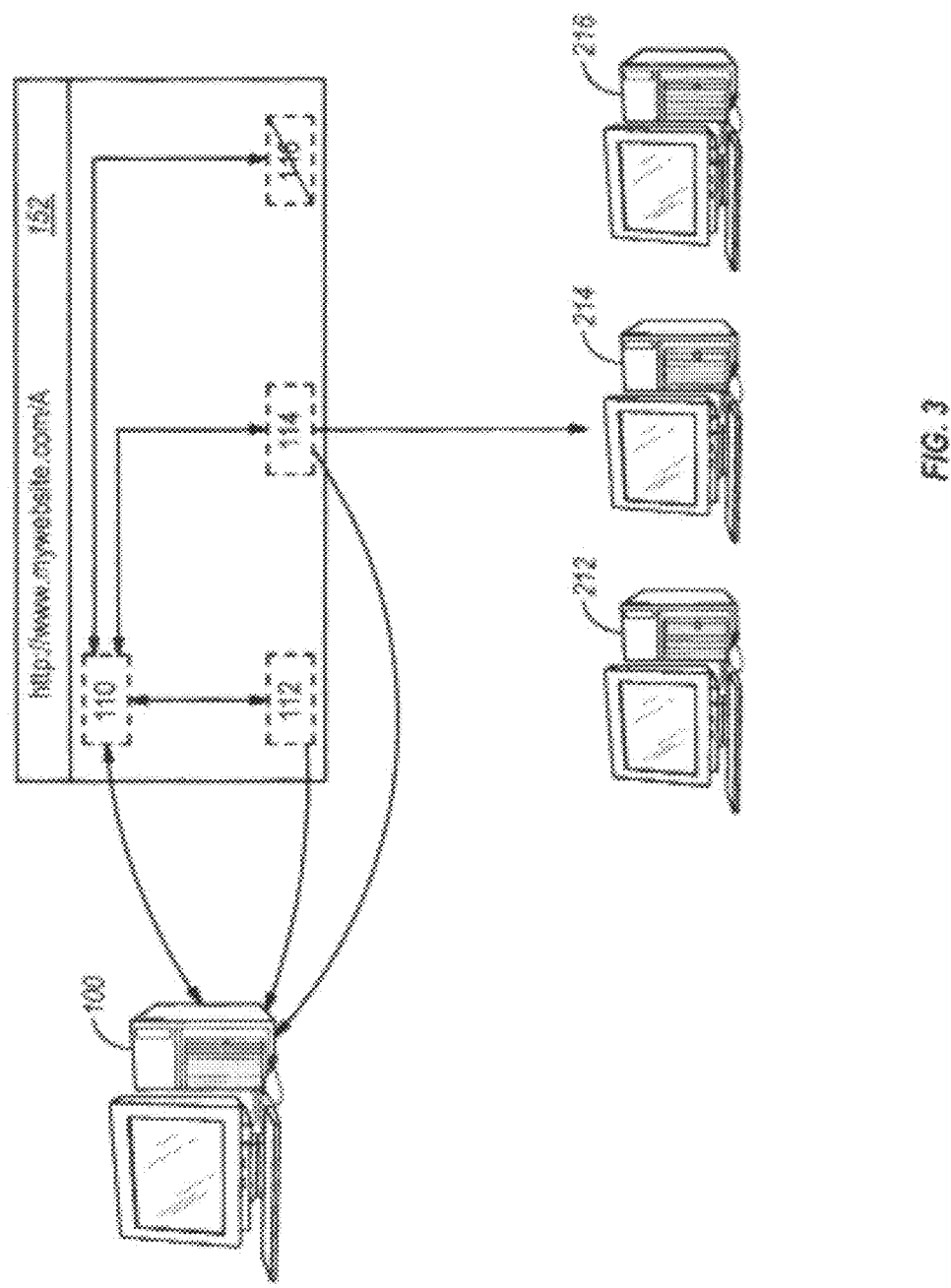
FIG. 3 illustrates another depiction of a webpage in communication with a plurality of servers, according to an embodiment.

In contrast, FIG. 3 illustrates another depiction of webpage 150 in communication with a plurality of servers 100, 212, 214, 216. In this depiction, the website 150 now includes a master tag 110, in addition to the other tags 112, 114, 116. The webpage 150 of FIG. 3 is being managed by the tag management system.

Additionally, in at least one implementation, the master tag 110 may mirror the communications from tag 114 to the master tag server 100, while allowing the tag 144 to continue to communicate with external server 214. In at least one implementation, the webpage owner or manager may desire to audit the information that is being transmitted by tag 114.

Accordingly, FIGS. 1-3 and the corresponding text illustrate or otherwise describe one or more components, modules, and/or mechanisms for automatically using a master tag to monitor and control other tags on a website. In particular, in at least one implementation, the present invention can implement a tag management system on a website without requiring the removal of other tags from each webpage. Additionally, in at least one implementation, a master tag can provide continuous control of the firing of tags on a web page so as to control the timing of the loading of advertisements and other paid content. One will appreciate that implementations of the present invention can also be described in terms of flowcharts comprising one or more acts for accomplishing a particular result. For example, FIGS. 4 and 5 and the corresponding text describe acts in a method for creating rules for tag management system, which rules can be created to control the timing of the loading of advertisements and other paid content on the website. The acts of FIGS. 4 and 5 are described below.

Figure 4:
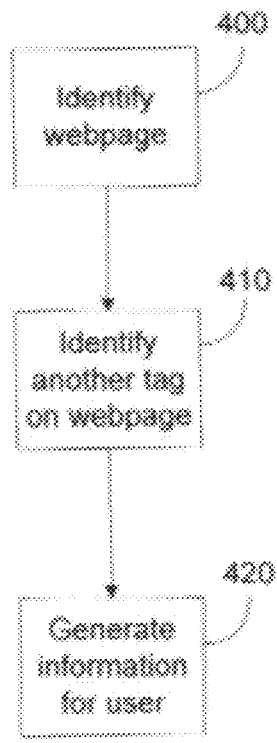
FIG. 4 illustrates a flow chart of a series of acts in a method in accordance with an implementation of the present invention for using a master tag to monitor and control other tags on a website, according to an embodiment.
Figure 5:
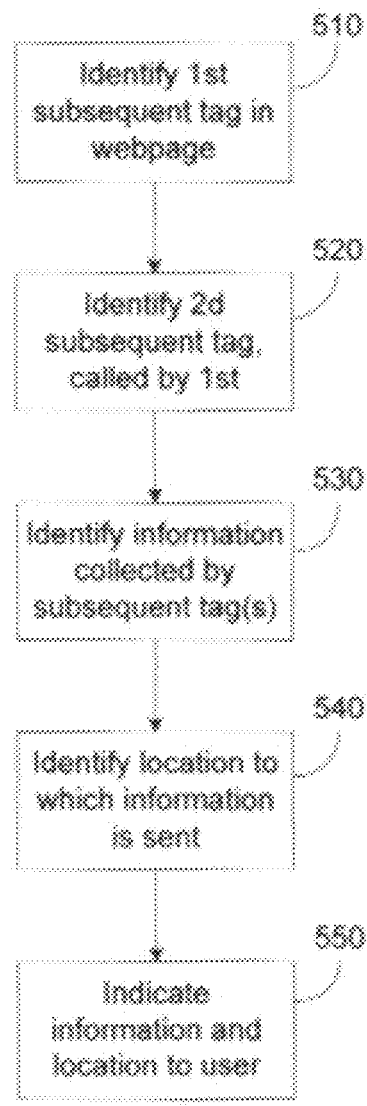
FIG. 5 is a flowchart illustrating the process of identifying n-party tags, according to an embodiment.

For example, FIG. 4 illustrates that a method for using a master tag 110 to monitor and control other tags 112, 114, 116 on a website 150 can include a process 400 for identifying a webpage. FIG. 4 also shows that the method can comprise act 410 of identifying another tag 112, 114, 116. Act 410 can include identifying, using a master tag embedded in the webpage, one or more characteristics of at least one other tag embedded within the webpage. For example, FIG. 1 shows master tag 110 identifying tags 112, 114, and 116 within webpage 150. In addition, FIG. 4 shows that the method can include act 420 of outputting data. Act 420 may include sending a report to a data store or otherwise presenting the reported information to a user, e.g., the owner or manager of the website. The information may be presented through an interface API in an embodiment. The reported data identifies one or more characteristics of the at least one other tag. This data can ultimately be provided to the owner or manager of the website.

The methods and systems described herein provide for the analysis of tags embedded in a webpage and of tags that may be called, directly or indirectly, by such embedded tags. In an embodiment, an example of such processing is illustrated in FIG. 5. At 510, a first subsequent tag is identified in a webpage by a master tag. At 520, a second tag, called by the first, is also identified. Note that in some situations, the first tag may call more than one second or subsequent tag, and that each subsequent tag may call one or more other subsequent tags. At 530, information collected by any or all of these subsequent tags is identified. At 540, the location to which this information is sent is identified. At 550, the collected information and the location are indicated to the user.

Figure 6:
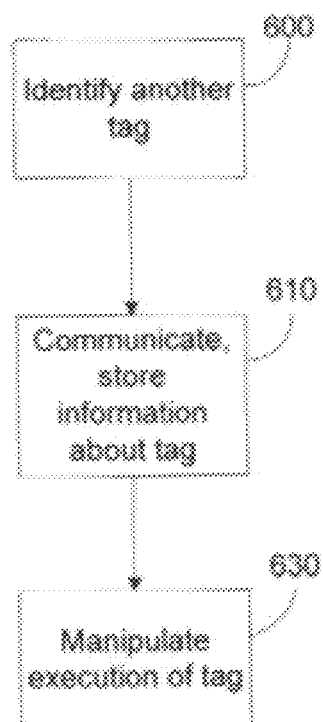
FIG. 6 illustrates another flow chart of a series of acts in a method in accordance with an implementation of the present invention for using a master tag to monitor and control other tags on a website, according to an embodiment.

FIG. 6 illustrates that a method for using a master tag to monitor and control other tags on a website can include an operation 600 of identifying another tag. Operation 600 can include identifying, using a master tag embedded within a source code of a webpage, one or more characteristics of at least one other tag within the webpage. For example, FIG. 1 shows master tag 110 identifying characteristics about tags 112, 114 and 116.

FIG. 6 also shows that the method can comprise operation 610 of communicating or storing information about a tag. In embodiments, the information regarding a tag may be communicated to and/or stored at the master tag server. Instructions for the execution of the master tag may be received from the master tag server. Alternatively, instructions from a server may not be necessary if the necessary logic is contained in the master tag in an embodiment. In the latter case, the logic in the master tag may be sufficient to manipulate the execution of the tag, as shown at operation 630. For example, FIG. 3 shows master tag 110 manipulating the execution of tags 112, 114, and 116. As described above, the master tag 110 can alter or halt the execution of an embedded tag according to an embodiment.

Figure 7:
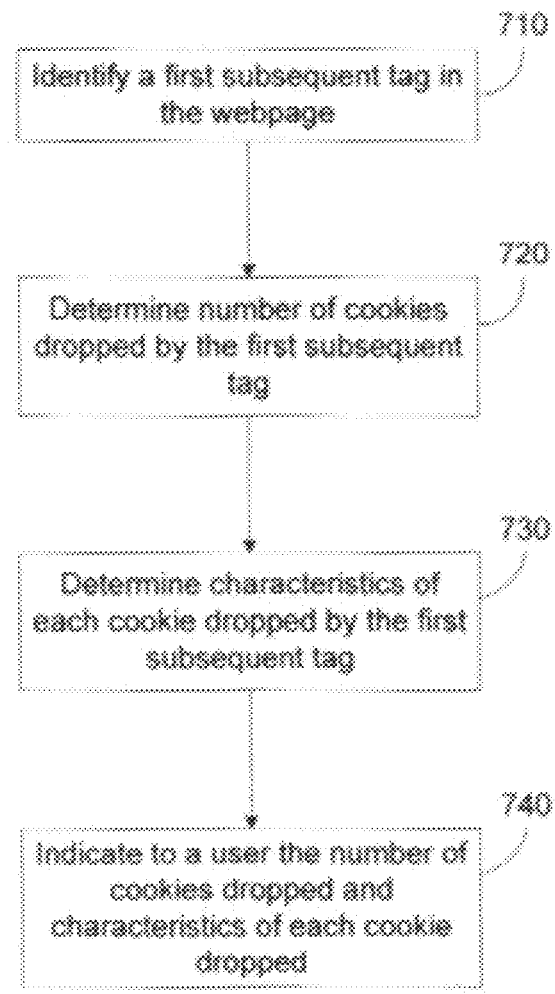
FIG. 7 is a flowchart illustrating the process of identifying cookies dropped by a tag, according to an embodiment.

As noted above, the master tag 110 may be configured to analyze a tag's behavior, with respect to dropping and/or examining cookies or with respect to other tag functions. FIG. 7 illustrates the analysis of the behavior of tags related to cookies, according to an embodiment. At 710, a first subsequent tag is identified in a webpage by a master tag. At 720, the number of cookies dropped by the first subsequent tag is determined. At 730, the characteristics of each cookie is determined. Such characteristics may include, for example, information collected by the cookie and/or a location to which the information is sent. At 740, the number of cookies and their characteristics are indicated to the user.

FIG. 8 illustrates that master tag 110 may be configured to prioritize the loading of content on a webpage. At 810, the pixels, in the form of a JPEG, PNG or other graphical file format or a rich media file such as Flash, video, or JavaScript, are identified as the first priority content to load on the page and can include an advertisement such as a leaderboard or content at the top of the page. At 820 the second priority pixels are is identified, which can include a "skyscraper" or similar ad along the side of the page. At 830 the next priority pixels are identified and its tags are enabled to fire, which can include the social sharing buttons that are in view. At 840, the next priority pixels are identified which can include content recommendation widgets. At 850, the next priority pixels are identified which can including all remaining advertisements on the page, and the order of firing of tags can be prioritized to reflect the distance from the website frame currently in view. At 860, the next priority pixels are identified which can including all remaining visual tags on the page, and the order of firing of such tags can be prioritized to reflect the distance from the website frame currently in view. At 870, the next priority pixels are identified which can including all remaining nonvisual tags on the page, and the order of firing of such tags can be prioritized to reflect the distance from the website frame currently in view.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available tangible non-transitory media that can be accessed by a general purpose or special purpose computer.

By way of example, and not limitation, such non-transitory computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The above description is intended by way of example only.

What is claimed is:

1. A method comprising:
in a computing device, executing a container tag embedded in a webpage, the container tag selectively tracking and executing at least one of a plurality of interface actions and monitoring actions by a plurality of other tags on the webpage including identifying by a technical name and a corresponding description an element considered by another tag in a browser environment, identifying a first subsequent tag in the webpage; identifying a second subsequent tag called by the first subsequent tag;
identifying a location of the plurality of other tags embedded on the webpage in relation to a portion of the webpage currently in a view on a viewer device; and
controlling an order of firing of said plurality of other tags in accordance with at least one of a plurality of rules determined to manipulate tag execution including at least one of accelerate rendering of a specific first paid content that falls within an active browser environment and delay rendering of a second paid content that falls outside the active browser environment to maximize viewability of the specific first paid content on the webpage and controlling operations of at least the first subsequent tag and at least the second subsequent tags including at least one of blocking and altering a tag functionality or at least one of capturing and redirecting tag communications.

2. The method of claim 1, including multiple other tags in addition to the first subsequent tag and the second subsequent tags, wherein the container tag in a form of at least one of a transparent graphics interchange format and a tracking pixel controls which of the multiple other tags are allowed to operate on the webpage, at least one of the transparent graphics interchange format and the tracking pixel stored in at least one of the webpage and a separate server from the webpage.

3. The method of claim 1, wherein the firing of specific tags from the plurality of tags is delayed until a relevant portion of the webpage is in the view of the viewer device interacting with the webpage.

4. The method of claim 1, wherein the firing of specific tags is first prioritized and subsequently automatically changed based on how the viewer device interacts with at least one of content on the webpage and other viewer actions.

5. The method of claim 1, wherein a collection of information relating to the viewer device interacting with the webpage is at least one of controlled and delayed in accordance with at least one of a plurality of rules determined by the viewer device.

6. The method of claim 1, wherein a collection of information relating to the viewer device interacting with the webpage is delayed until a relevant portion of the webpage is considered viewable by the viewer device interacting with the webpage.

7. The method of claim 1, wherein the container tag is operable to monitor an interaction of another tag via a record created on a website hosting a web page, by determining a number of cookies dropped and characteristics of a particular cookie, wherein the characteristics of the particular cookie include at least one of content, expiration, and size.

8. The method of claim 7, wherein the container tag is operable to override at least one of a plurality of functions of a subsequent tag, by stopping an operation of said subsequent tag or by redirecting an output by said subsequent tag.

9. The method of claim 1, wherein the interface actions by said container tag, includes at least one of displaying an ad and displaying a social widget, providing a news ticker, and playing a video.

10. The method of claim 1, wherein the interface actions by said container tag comprises an order in which information is provided to the viewer device on which the webpage is displayed.

11. At least one non-transitory computer readable storage media encoded with a software comprising computer executable instructions wherein, when the software is executed in a computing device, the computer executable instructions are incorporated in a container tag embedded in a webpage and are operable to:
execute the container tag embedded in the webpage by firing the container tag before any other tags, said container tag operable to monitor said any other tags on the webpage before and while they execute to analyze functions of said any other tags on the webpage including identifying one or more elements in a browser environment being examined by any one of said any other tags, said container tag in accordance with one function providing a technical name of a browser data element and providing a corresponding description; the container tag embedded by an external server to operate in said browser environment and selectively track and execute a plurality of control and interface actions to:
identify at least a first subsequent tag in the webpage via the container tag;
identify a second subsequent tag called by at least the first subsequent tag;
identify a location of at least the first subsequent tag embedded on the webpage relative to a portion of the webpage currently in view; and
control an order of firing of first and second subsequent tags in accordance with at least one of a plurality of rules determined to control timing of loading of a paid content, the order of the firing of specified tags prioritized to maximize viewability of said paid content on the webpage by rendering said paid content that falls within an active browser environment first or delaying rendering of said paid content that falls outside the active browser environment and controlling operations of at least the first subsequent tag and the second subsequent tag including at least one of blocking and altering a tag functionality or at least one of capturing and redirecting tag communications.

12. The non-transitory computer readable storage media of claim 11, including multiple tags in addition to the first subsequent tag and the second subsequent tags, wherein the container tag controls which of the multiple tags are allowed to operate on the webpage.

13. The non-transitory computer readable storage media of claim 11, wherein the firing of the specified tags is delayed until a relevant portion of the webpage is in a view of a party interacting with the webpage.

14. The non-transitory computer readable storage media of claim 11, wherein the firing of the specified tags can be prioritized and then later automatically changed based on how a visitor interacts with at least one of content on the webpage and other visitor actions.

15. The non-transitory computer readable storage media of claim 11, wherein a collection of information relating to a party interacting with the webpage is controlled or delayed in accordance with at least one of a plurality of rules determined by a viewer device.

16. The non-transitory computer readable storage media of claim 11, wherein a collection of information relating to a party interacting with the webpage is delayed until a relevant portion of the webpage is considered viewable by the party interacting with the webpage.

17. The non-transitory computer readable storage media of claim 11, wherein the container tag is operable to monitor an interaction of another tag via a record created on a website, by determining a number of cookies dropped and characteristics of a particular cookie, wherein the characteristics of the particular cookie include at least one of content, expiration, and size.

18. The non-transitory computer readable storage media of claim 11, wherein the container tag is operable to override one or more functions of a subsequent tag, by stopping operation of said subsequent tag or by redirecting an output by said subsequent tag.

19. The non-transitory computer readable storage media of claim 11, wherein the interface action by said container tag, includes at least one of displaying an ad or social widget, providing a news ticker, and playing a video and wherein the interface comprises an order in which information is provided to a viewer device on which the webpage is displayed.

20. The non-transitory computer readable storage media of claim 11, wherein a particular tag is identified by reference to a tag database and tag activity is analyzed by machine learning.

* * * * *